US 12,495,775 B2

(12) United States Patent
Graeb et al.

(10) Patent No.: US 12,495,775 B2
(45) Date of Patent: Dec. 16, 2025

(54) AQUATIC HABITAT STRUCTURE AND ASSOCIATED METHOD

(71) Applicant: UGLY HABITATS COMPANY, INC., Orlando, FL (US)

(72) Inventors: Brian Graeb, Willow Lake, SD (US); Matthew Rayl, Russiaville, IN (US); Douglas Todd Childress, Orlando, FL (US); Troy Goldsby, Lawrenceburg, TN (US)

(73) Assignee: UGLY HABITATS COMPANY, INC., Orlando, FL (US)

( * ) Notice: Subject to any disclaimer, the term of this patent is extended or adjusted under 35 U.S.C. 154(b) by 0 days.

(21) Appl. No.: 18/934,102

(22) Filed: Oct. 31, 2024

(65) Prior Publication Data

US 2025/0134076 A1    May 1, 2025

Related U.S. Application Data

(60) Provisional application No. 63/595,024, filed on Nov. 1, 2023.

(51) Int. Cl.
*A01K 61/73* (2017.01)

(52) U.S. Cl.
CPC .................................. *A01K 61/73* (2017.01)

(58) Field of Classification Search
CPC ...... A01K 61/75; A01K 61/70; A01K 63/006; A01K 61/73

(Continued)

(56) References Cited

U.S. PATENT DOCUMENTS 3,214,318 A  *  10/1965  Snow ..................... A47G 33/06
                                                         428/18
3,267,679 A  *  8/1966  Morse ....................... E02B 3/04
                                                         405/35

(Continued)

FOREIGN PATENT DOCUMENTS

CN         104823890 A  *  8/2015  ............. A01K 61/70
JP          09172904 A   *  7/1997  ........... A01K 63/006

OTHER PUBLICATIONS

Pond King—Artificial Habitat; www.Pondking.com; 11 pages; Downloaded Jan. 8, 2025.

(Continued)

*Primary Examiner* — Monica L Perry
(74) *Attorney, Agent, or Firm* — Timothy H. Van Dyke; Wolter Van Dyke Davis, PLLC

(57) ABSTRACT

An aquatic habitat structure for a body of water includes tree sections coupled together to form an artificial tree. Each tree section includes a trunk having a cylindrical shape with opposing ends and a curved surface extending therebetween, and a first plurality of leaflets covering the curved surface of the trunk. Spaced-apart layers of limbs extend outwards from the curved surface of the trunk. Each layer of limbs includes a plurality of limbs, and each limb includes a plurality of branches. Each branch is covered by a second plurality of leaflets. Each leaflet in the first and second plurality of leaflets provide a biologic surface area for adherence of periphytons to enhance water quality in the body of water, and with the biologic surface area including textured regions to provide additional biologic surface areas for the adherence of the periphytons to further enhance the water quality.

20 Claims, 10 Drawing Sheets

(58) Field of Classification Search
USPC .......................................................... 428/15
See application file for complete search history.

(56) References Cited

U.S. PATENT DOCUMENTS

| | | | | |
|---|---|---|---|---|
| 3,573,143 | A * | 3/1971 | Baus ...................... | A41G 1/007 428/23 |
| 3,682,753 | A * | 8/1972 | Willinger ................. | A41G 1/00 428/23 |
| 4,185,743 | A * | 1/1980 | Willinger ............. | A01K 63/006 428/20 |
| 4,369,216 | A * | 1/1983 | Willinger ............. | A01K 63/006 428/17 |
| 4,594,950 | A * | 6/1986 | Morris ................... | A47B 13/12 108/150 |
| 4,727,672 | A * | 3/1988 | Hill ........................ | A01K 61/70 428/17 |
| 6,391,399 | B1 * | 5/2002 | Woltmann ........... | A01K 63/006 428/17 |
| 6,978,735 | B1 * | 12/2005 | Yeager ................... | A01K 61/70 119/221 |
| 9,560,838 | B1 * | 2/2017 | King ...................... | A01K 97/01 |
| 10,602,725 | B1 * | 3/2020 | Ewald ................... | A01K 61/70 |
| 2009/0283051 | A1 * | 11/2009 | Metzler ................. | A01K 61/70 119/221 |
| 2017/0112106 | A1 * | 4/2017 | Marsden ................ | A01K 97/00 |
| 2024/0284881 | A1 * | 8/2024 | Giraldes ................ | A01K 61/73 |

OTHER PUBLICATIONS

Penn State Extension; Christmas Trees: A Gift for the Fish; www.extension.psu.edu/christmas-trees-a-gift-for-the-fish; 2 pages; Downloaded Jan. 8, 2025.

* cited by examiner

AQUATIC HABITAT STRUCTURE AND ASSOCIATED METHOD

CROSS-REFERENCE TO RELATED APPLICATION

The present application claims the benefit of U.S. Provisional Patent Application Ser. No. 63/595,024 filed Nov. 1, 2023, all of which is fully incorporated by reference.

TECHNICAL FIELD

The present disclosure relates to aquatic structures, and, more particularly, to an artificial aquatic habit structure for the enhancement of fish populations and water quality.

BACKGROUND

Freshwater environments may suffer from insufficient and unbalanced populations of fisheries, resulting in low fish abundance, small fish health, and poor recreational fishing. Additionally, many freshwater environments may suffer from unhealthy nutrient balances, as well as insufficient organic biomaterials for healthy water quality and food for aquatic life.

One approach for improving a fish habitat in freshwater environments is to repurpose Christmas trees after the holidays. When Christmas trees are sunken into water bodies, they increase the complexity of the aquatic habitat. The whorled branching structure of many coniferous trees acts as a refuge from predation by both establishing physical barriers in many different directions and creating shadows that easily camouflage sunfish, perch, or other prey species of fish. Woody debris provides a place for aquatic macroinvertebrates to live, which in turn may attract insect-loving fish, such as bass, bluegill, and small yellow perch. The overall abundance of fish in and around sunken trees may also attract piscivorous fish, such as smallmouth bass and walleye, and these predators are often found in and around structures that have a plentitude of prey. In general, studies have found that species richness, diversity, and abundance of fish tends to increase with the presence of submerged trees with complex branching. However, a limitation of submerged Christmas trees is that the needles generally fall off within the first three months, and the trees decay over time due to algae growth.

Consequently, natural habitats biodegrade with time and fail to maintain healthy environments long term. Chemical treatment of waterways to address nutrient values can create other non-desirable effects, such as altered pH and destruction of other desired nutrients or organisms, sometimes leading to large fish kills.

Another approach for improving a fish habitat in freshwater environments is to use artificial structures. An example artificial habitat structure from MossBack Fish Habitat includes a one-piece trunk with deep cutouts spaced throughout. The cutouts allow limbs to be inserted to a desired length. The limbs are V-shaped to promote sediment and plant growth to attract the fish while a condensed and flexible limb pattern replicates the look and feel of natural cover to keep the fish there. The trunk and V-shaped limbs are made from recycled PVC.

Even in view of the above approaches, there is still a need to improve on the enhancement of fish populations and water quality in a body of freshwater.

SUMMARY

An aquatic habitat structure for a body of water includes a plurality of tree sections coupled together to form an artificial tree. Each tree section may include a trunk having a cylindrical shape with opposing ends and a curved surface extending therebetween, and a first plurality of leaflets covering the curved surface of the trunk. A plurality of spaced-apart layers of limbs may extend outwards from the curved surface of the trunk, with each layer of limbs comprising a plurality of limbs. Each limb comprises a plurality of branches, and each branch may be covered by a second plurality of leaflets. Each leaflet in the first and second plurality of leaflets provides a biologic surface area for adherence of periphytons to enhance water quality in the body of water, and with the biologic surface area comprising textured regions to provide additional biologic surface areas for the adherence of the periphytons to further enhance the water quality in the body of water.

Each leaflet may have a rectangular shape, and the textured regions may be imprinted on the biologic surface area. The texturing increases surface area, as well promotes the adherence of periphytons and other beneficial organisms. The textured regions may be configured as a uniform pattern of contouring that includes bumps, grooves and ridges. Each branch may be covered with the second plurality of leaflets at a density of 90-100 leaflets per centimeter in length.

The layer of limbs for each tree section may be spaced apart from an adjacent layer of limbs within a range of 7 to 9 inches on the trunk to create communal areas for the congregation of juvenile fish in the body of water, with the communal areas providing protection from larger predator fish. Each limb may be flexible for bending and shaping, and may be movable between a stored position and a deployed position, with a free end of each limb in the deployed position being bent and shaped to vary a distance between the limbs in an adjacent layer of limbs.

The plurality of tree sections may include a lower tree section, a middle tree section coupled to the lower tree section, and an upper tree section coupled to the middle tree section. A width of the lower tree section may be equal to a width of the upper tree section, and a width of the middle tree section may be less than the width of the lower and upper tree sections to define an hourglass shape of the artificial tree.

The aquatic habitat structure may include a buoyancy float coupled to an uppermost tree section to keep the artificial tree in an upright position. The tree sections may be interchangeable with one another, and coupled together using detent pins.

The aquatic habitat structure may include an adapter and a fork structure. The adapter has a first end configured to receive a bottom end of a lowermost tree section of the artificial tree, and a second end. The fork structure may be coupled to the second end of the adapter, and may be configured to be inserted into a bottom surface of the body of water to hold the artificial tree in an upright position. A weighted block may be carried by the adapter and the fork structure.

In another embodiment, the aquatic habitat structure may include an adapter and a weighted base. The adapter has a first end configured to receive a bottom end of a lowermost tree section of the artificial tree, and a second end. The weighted base may be coupled to the second end of the adapter, and may be configured to rest on a bottom surface of the body of water to hold the artificial tree in an upright position.

The aquatic habitat structure may include at least one additional tree section not coupled to the plurality of tree sections, and at least one additional adapter having a first end configured to receive a bottom end of the at least one additional tree section, and a second end. The weighted base may be configured as a plurality of intersecting arms, with an end of at least one of the arms configured to be coupled to the second end of the at least one additional adapter so that the at least one additional tree section is resting on the bottom surface of the body of water adjacent the artificial tree.

Another aspect is directed to an aquatic habitat structure for a body of water that includes a plurality of tree sections coupled together to form an artificial tree, with each tree section including a trunk, and a first plurality of leaflets on the trunk. A plurality of spaced-apart layers of limbs may extend outwards from the trunk, with each layer of limbs including a plurality of limbs. Each limb may include a plurality of branches, and each branch may be covered by a second plurality of leaflets. Each leaflet in the first and second plurality of leaflets may have a rectangular shape and provides a biologic surface area for adherence of periphytons to enhance water quality in the body of water. The biologic surface area may include textured regions to provide additional biologic surface areas for the adherence of the periphytons to further enhance the water quality in the body of water. The textured regions may be configured as a uniform pattern of contouring comprising bumps, grooves and ridges.

Another aspect is directed to a method for improving water quality in a body of water. The method includes coupling a plurality of tree sections together to form an artificial tree as described above, and placing the artificial tree in the body of water.

DETAILED DESCRIPTION

The present description is made with reference to the accompanying drawings, in which exemplary embodiments are shown. However, many different embodiments may be used, and thus the description should not be construed as limited to the particular embodiments set forth herein. Rather, these embodiments are provided so that this disclosure will be thorough and complete. Like numbers refer to like elements throughout.

An artificial aquatic habitat structure for the enhancement of fish populations and water quality in a body of water will be discussed. The aquatic habitat structure is for mimicking ideal freshwater natural habitats, for providing juvenile fish a habitat that protects them from predator species, and for promoting a larger population of fish growing to maturity, as well as large healthier adult fish. In addition, the artificial aquatic habitat structure promotes the growth of natural periphytons on biologic surface areas of the artificial aquatic habitat structure, which improves water quality and provides necessary nutrients and protection for the aquatic food chain.

Figure 1:
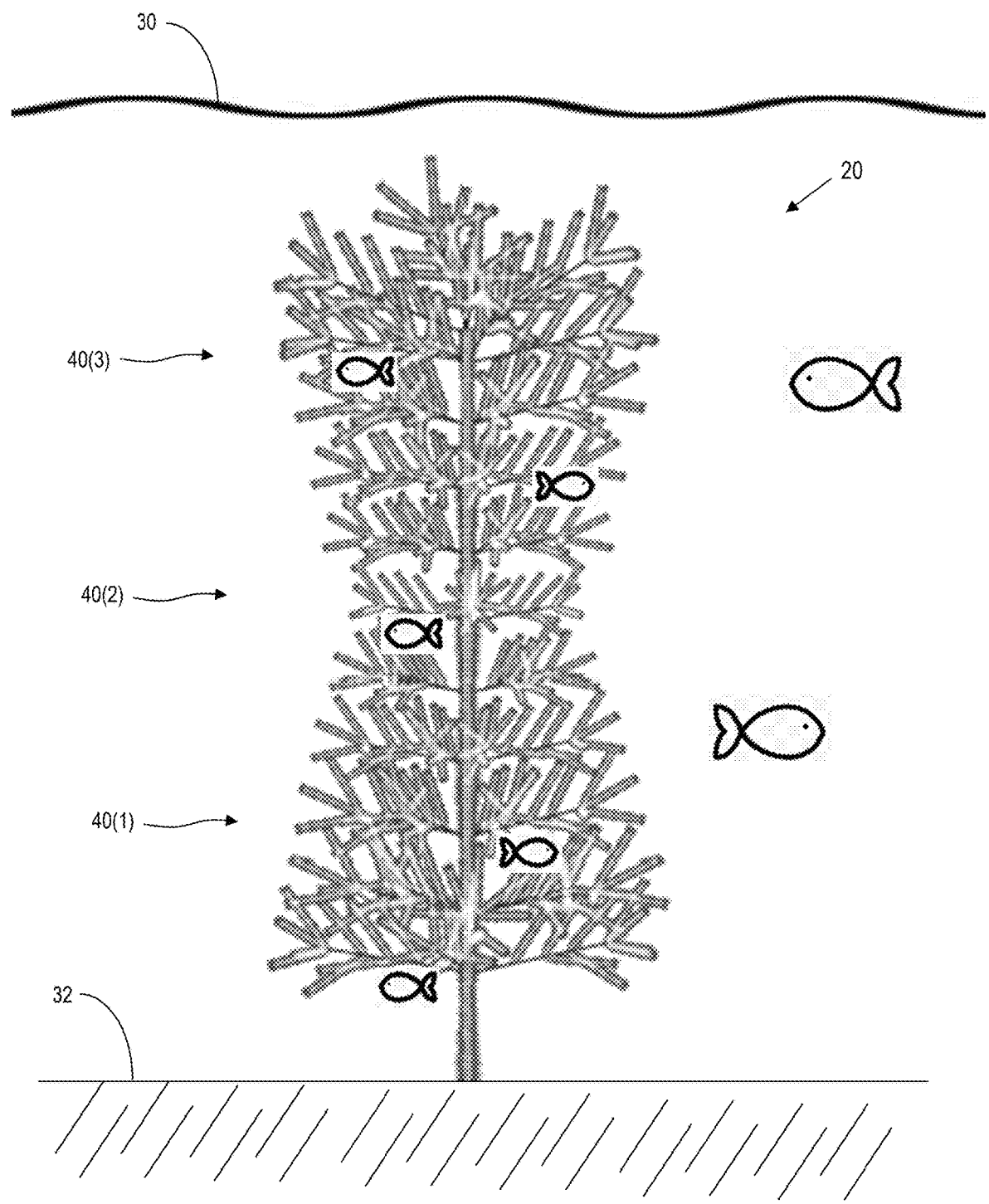
FIG. 1 is a side perspective view of an aquatic habitat structure in an upright position within a body of water in which various aspects of the disclosure may be implemented.
Figure 2:
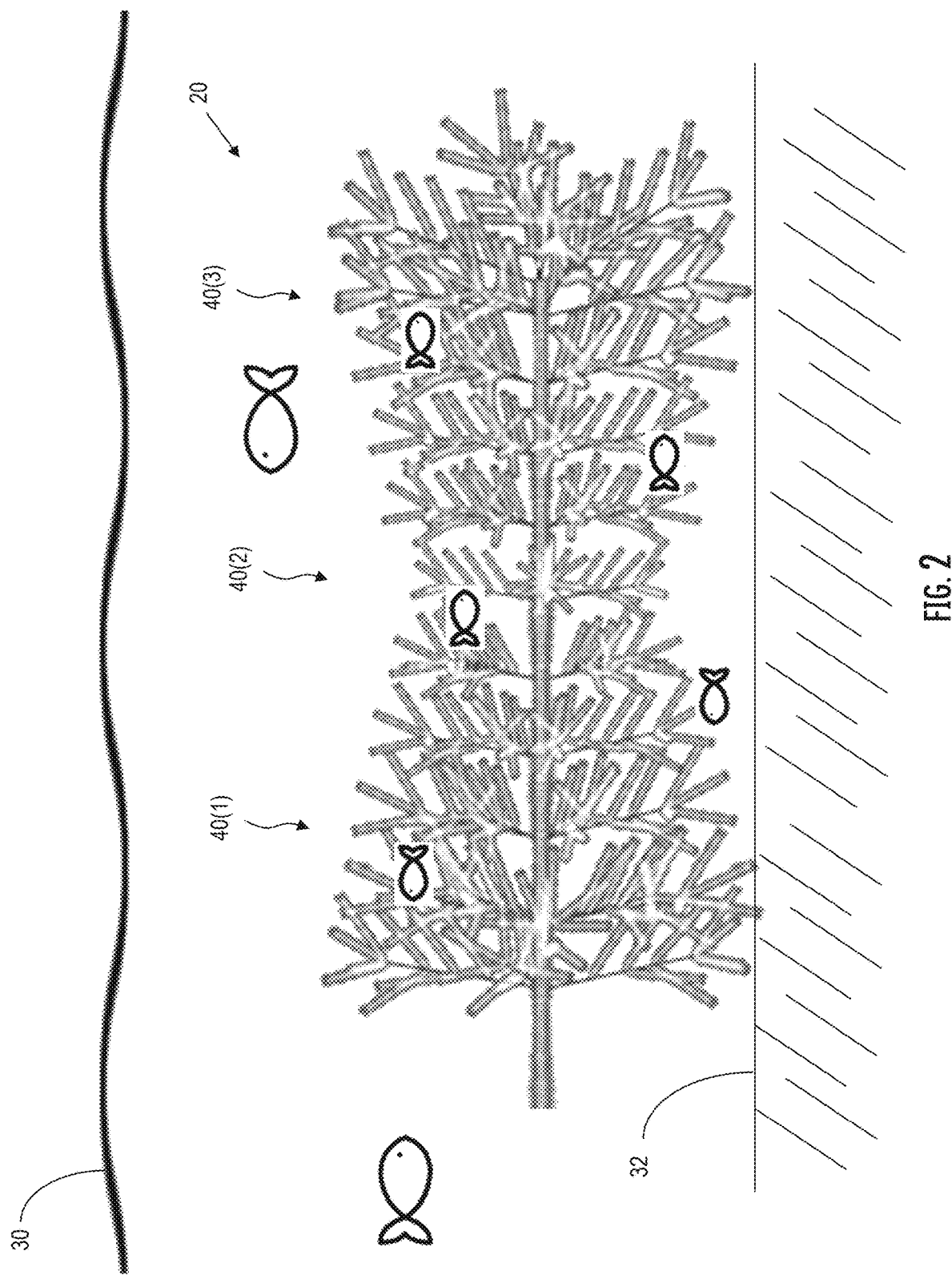
FIG. 2 is a side perspective view of the aquatic habitat structure illustrated in FIG. 1 in a horizontal position.

Referring initially to FIGS. 1 and 2, the aquatic habitat structure 20 includes a plurality of tree sections 40(1)-40(3) coupled together to form an artificial tree. The aquatic habitat structure 20 may be placed in an upright position on the bottom 32 of the body of water 30 as shown in FIG. 1, or on its side on the bottom 32 of the body of water 30 as shown in FIG. 2.

The aquatic habitat structure 20 provides numerous benefits to conventional systems and methods for juvenile fish by copying natural environment features and designs. Additionally, water quality improvement is currently most often controlled by chemical additives to the water and not through habitat modification and enhancement. In contrast, the aquatic habitat structure 20 is constructed with non-biodegradable materials, providing a long-lasting, sustainable impact on fish populations and water quality.

In addition, conventional chemical treatment systems and methods provide only a temporary remedy for some of the symptoms of poor water quality. However, they require regular re-application and maintenance to provide ongoing benefits. In contrast, the aquatic habitat structure 20 is not chemically based and does not directly alter the water composition, thus providing natural solutions to fish populations and water quality issues.

Each tree section 40(1)-40(3) may be generally referred to as a tree section 40. The aquatic habitat structure 20 is not limited to three tree sections 40 coupled together. If a depth of the body of water 20 is shallow, then a single tree section 40 or a pair of tree sections 40 coupled together may be used. Likewise, if the depth of the body of water 20 is deep, then four or more tree sections 40 may be coupled together.

A height of each tree section 40 may be 24 inches, for example. For three tree sections 40(1)-40(3) coupled together, a height of the aquatic habitat structure 20 is 72 inches. The 24 inch height of each tree section 40 is for illustrative purposes and is not to be limiting. As readily appreciated by those skilled in the art, the height of the tree sections 40 may vary based on the intended environments for the aquatic habitat structure 20.

Figure 3:
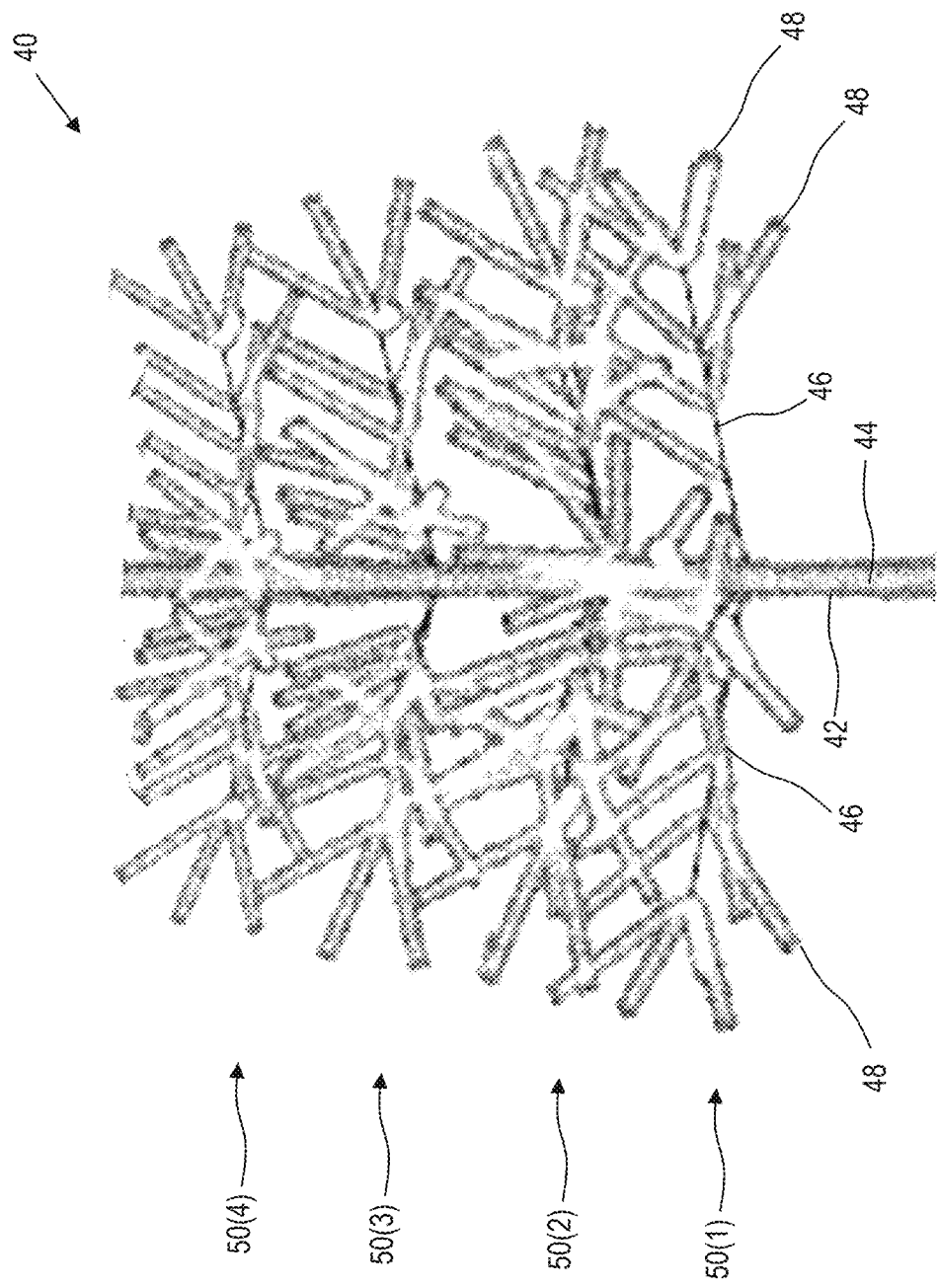
FIG. 3 is a side perspective view of one of the tree sections in the aquatic habitat structure illustrated in FIG. 1.
Figure 4:
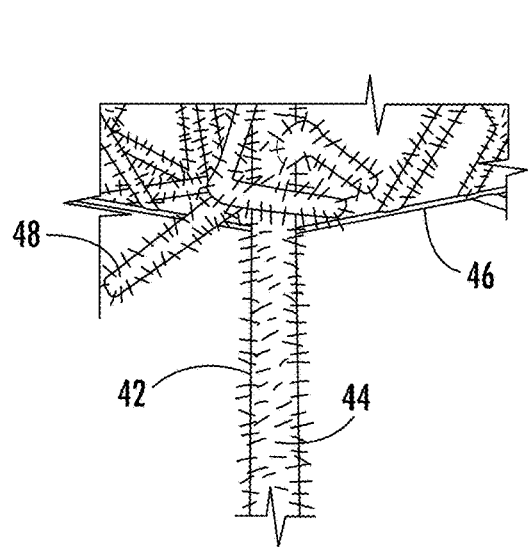
FIG. 4 is a close-up view of the trunk covered by leaflets for the tree section illustrated in FIG. 3.

Each tree section 40 includes a trunk 42 covered by a first plurality of leaflets 44, as illustrated in FIG. 3. A closeup view of the leaflets 44 on the trunk 42 is provided in FIG. 4. The first plurality of leaflets 44 may be formed by bending waterproof, rust-resistant metal wires around the trunk 42 with flexible leaflets 44 woven into the metal wires with a waterproof thread. This secures the flexible waterproof leaflets 44 onto the entire body of the trunk 42. As will be discussed below, the leaflets 44 provide an essential function as a habitat and nutrient-binding surface.

Spaced apart layers of limbs 50(1)-50(4) extend outwards from the trunk 42. Each layer of limbs 50(1)-50(4) may be generally referred to a layer of limbs 50. A spacing between adjacent layers of limbs 50 on the trunk 42 may vary between 7 to 9 inches, for example, for a tree section 40 having a 24 inch height. The trunk 40 is constructed using rust-resistant materials, including metals and plastics.

Each layer of limbs 50 includes individual limbs 46. The number of individual limbs 46 in each layer of limbs 50 will vary based on a diameter of the trunk 42. For a trunk 42 having a 1-inch diameter, there are 5-8 limbs 46 for each layer of limbs 50. The limbs 46 may be woven into the trunk 42 or attached by other methods, including clamps, clips snaps or adhesives. The material making up the limbs 46 and its attachment are also rust-resistant. The limbs 46 are flexible in construction, allowing the limbs 46 to be bent and shaped as desired.

A length of the individual limbs 46 may vary between 13 to 24 inches, for example. Each limb 46 includes individual branches 48. The number of branches 48 on each limb 46 may vary between 6 to 10 branches 48, for example. As also readily appreciated by those skilled in the art, the length of the individual limbs 46 and the number of branches 48 on each limb 46 may vary based on the intended environments for the aquatic habitat structure 20.

Figure 5:
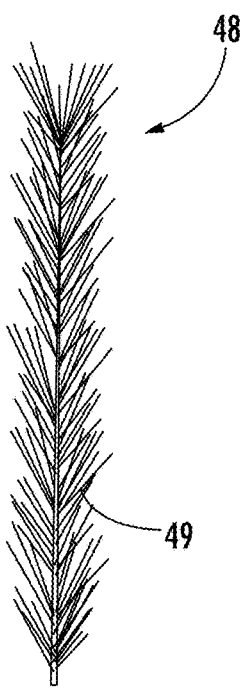
FIG. 5 is a close-up view of one of the branches covered by leaflets for the tree section illustrated in FIG. 3.

Each branch 48 is covered with a second plurality of leaflets 49 as illustrated in FIG. 5. Each branch 46 may be formed by weaving flexible leaflets 49 into a metal wire with a waterproof thread. As will also be discussed below, the leaflets 49 provide an essential function as a habitat and nutrient-binding surface.

The leaflets 49 are configured to resemble an evergreen tree's natural configuration but are constructed specifically to be submerged in water. The leaflets 49 on each branch 48 may have a density of 90-100 leaflets per centimeter in length. In contrast, a density of the leaflets 44 on the trunk 42 is typically three times greater.

Figure 6:
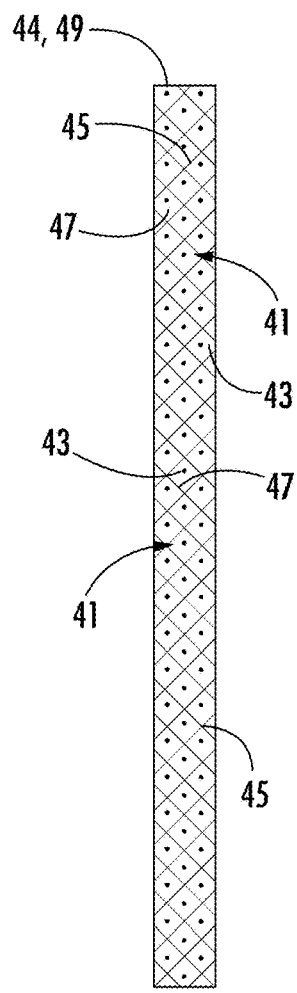
FIG. 6 is a close-up view of one of the leaflets with textured regions for the tree section illustrated in FIG. 3.

The first and second plurality of leaflets 44, 49 provide a biologic surface area (BSA) for adherence of periphytons to enhance water quality in the body of water 30. In addition, each individual leaflet 44, 49 has textured regions 41 on the biologic surface area to advantageously provide additional surface areas for the adherence of the periphytons to further enhance the water quality in the body of water 30, as illustrated in FIG. 6.

Each individual leaflet 44, 49 may be rectangular shaped. In one example, the textured regions 41 may be imprinted on each leaflet 44, 49 with a roller. The textured regions 41 may be configured as a uniform pattern of contouring. The uniform pattern includes bumps 43, grooves 45 and ridges 47. Each bump 43 is on its own ridge 47 which is defined by the grooves 45. The grooves 45 intersect one another to form diamond shaped patterns on the leaflet 44, 49. The textured regions 41 provide a rough surface, similar to sandpaper, for example. The textured regions 41 advantageously increase the biological surface area of the leaflet 44, 49, as well promote the adherence of periphytons and other beneficial organisms The leaflets 44, 49 are composed of a non-biodegradable, flexible material, such as plastic. The leaflets 44, 49 may be produced in different colors. An example length of each leaflet 44, 49 may be within a range of 22 to 23 mm, and an example width may be within a range of 1.5 to 1.6 mm.

As noted above, the aquatic habitat structure 20 is engineered to provide a submersible artificial habitat for juvenile fish. Additionally, the aquatic habitat structure 20 is shaped and configured with ideal biologic surface areas to promote the growth of periphytons to help the aquatic life cycle.

The biologic surface area for each leaflet 44, 49 consists of a contoured flexible media creating an optimal surface area and communal spaces designed to promote and maximize the growth and sustenance of beneficial aquatic organisms. This includes single cell organisms and bacteria, water clarifying vegetation, and animal species. The biologic surface area is the surface area on the aquatic habitat structure 20 on which microbes can live. The biologic surface area is very important in aquatic habitats because these microbes are the engines of a healthy aquatic ecosystem. Microbes oxidize ammonia, assist in nitrification and promote the growth of periphyton colonies.

Leaflet 44, 49 and limb 46 density and lengths are designed to provide hiding environments for fry and juvenile fish. The leaflets 44, 49 and limbs 46 provide ideal hiding places for fry and juvenile fish, especially from predator fish. The aquatic habitat structure 20 protects the young fish by preventing the predator fish from gaining access to them. The limbs 46 also provide hiding spaces where they cannot be detected by predators. The design of the leaflets 44, 49 and limbs 46 also vary in density, allowing protection for small fish and appropriate hiding spaces for the fish as they grow to maturity.

One advantage of the aquatic habitat structure 20 is that it allows more fish to survive their most vulnerable stages of life. In doing so, the fish populations grow in size, and the abundance that reaches maturity increases.

As noted above, the leaflets 44, 49 are engineered to promote optimal growth of periphytons, a driver in both good water quality and food for aquatic life. The above-described example artificial tree that includes tree sections 40(1)-40(3) may include over 1,000,000 leaflets. This allows the aquatic habitat structure 20 to provide an ideal surface area for the growth of periphytons, which need a proper surface to attach and grow from. Periphytons have been shown in studies to improve water quality in lakes by effectively controlling nitrogen (N) and phosphorous (P), which are nutrients in water that are essential for plant and animal growth.

Periphytons also reduce nephelometric turbidity unit (NTU) in water to increase clarity and the concentration of chlorophyll-a (Chl-a). Chlorophyll-a is a bluish-green pigment found in algae, plants, and cyanobacteria that absorbs sunlight and is used to measure the amount of algae in water.

For the aquatic habitat structure 20 illustrated in FIGS. 1 and 2, the artificial tree formed by the coupled together tree sections 40(1)-40(3) has an hourglass shape. This is based on the lower tree section 40(1) and the upper tree section 40(3) having the same width, with a width of the middle tree section 40(2) being less than the width of the lower and upper tree sections 40(1), 40(3).

As noted above, a length of the individual limbs 46 may vary between 13 to 24 inches, and the trunk 42 may have a 1-inch diameter. If the length of the limbs 46 in the lower and upper tree sections 40(1), 40(3) is 24 inches, then this corresponds to a width of 49 inches. Likewise, if the length of the limbs 46 in the middle tree section 40(2) is 13 inches, then this corresponds to a width of 27 inches. The ratio between the lower and upper tree sections 40(1), 40(3) to the middle tree section 40(2) is about 1.8 to 1. The hourglass shape of the artificial tree is advantageous over a conical shape since the hourglass shape provides shade and necessary cooler water under the habitat for a greater number of growing days for fish. Alternatively, the artificial tree may have a cylindrical or irregular shape.

The aquatic habitat structure 20 is configured to mimic natural occurring aquatic habitats, primarily aquatic vegetation, for the specific density provided by those natural habitats. This creates a habitat that is as natural as possible leading to juvenile fish to grow, which in turn provides a greater top end growth of predator fish. In addition, the aquatic habitat structure 20 cleans the water and provides spawning and protective habitat for aquatic organisms.

Figure 7:
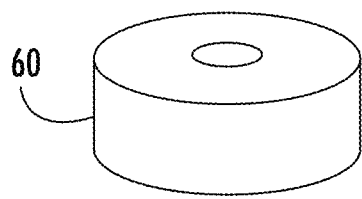
FIG. 7 is a side perspective view of a buoyancy float for the aquatic habitat structure illustrated in FIG. 1.

To hold the hourglass-shaped artificial tree in an upright position, a buoyancy float 60, as shown in FIG. 7, may be attached to the upper tree section 40(3). The illustrated buoyancy float 60 has a doughnut shape, even though other shapes may be readily used. A cord or zip tie may be used to secure the buoyancy float 60 to the upper tree section 40(3). Alternatively, the buoyancy float 60 may have a slit extending between the center and an outer edge so that the center of the doughnut shaped buoyancy float 60 wraps around the trunk 42 of the upper tree section 40(3). The buoyancy float 60 may also be used on other shapes of the artificial tree, such as cylindrical and conical shapes, for example.

Figure 8:
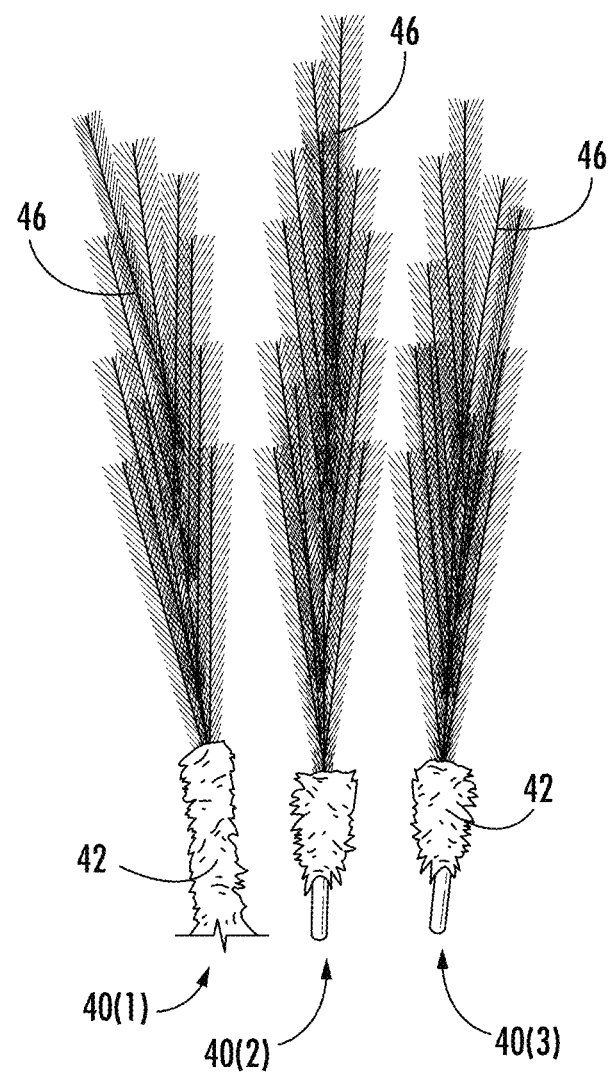
FIG. 8 is a side perspective view of the tree sections in the aquatic habitat structure illustrated in FIG. 1 decoupled from one another and in a stored position.

Referring now to FIG. 8, the limbs 46 are flexibly coupled to the trunk 42 of each tree section 40 and are movable between a stored position and a deployed position. The tree sections 40(1), 40(2) and 40(3) in FIG. 8 are in the stored position. In the fully deployed position, the width of each tree section 40 is at its maximum.

The limbs 46 are flexible in construction, allowing the limbs 46 to be bent and shaped as desired. This allows a free end of each limb 46 in the deployed position to be adjustable to vary a distance between the limbs 46 in the deployed position in an adjacent layer of limbs 50. This is turn varies a density of the limbs 46 in a given area. The limbs 46 may be bent and shaped on the trunk 42 to create communal areas for the congregation of juvenile fish in the body of water 30, with the communal areas providing protection from larger predator fish.

Figure 9:
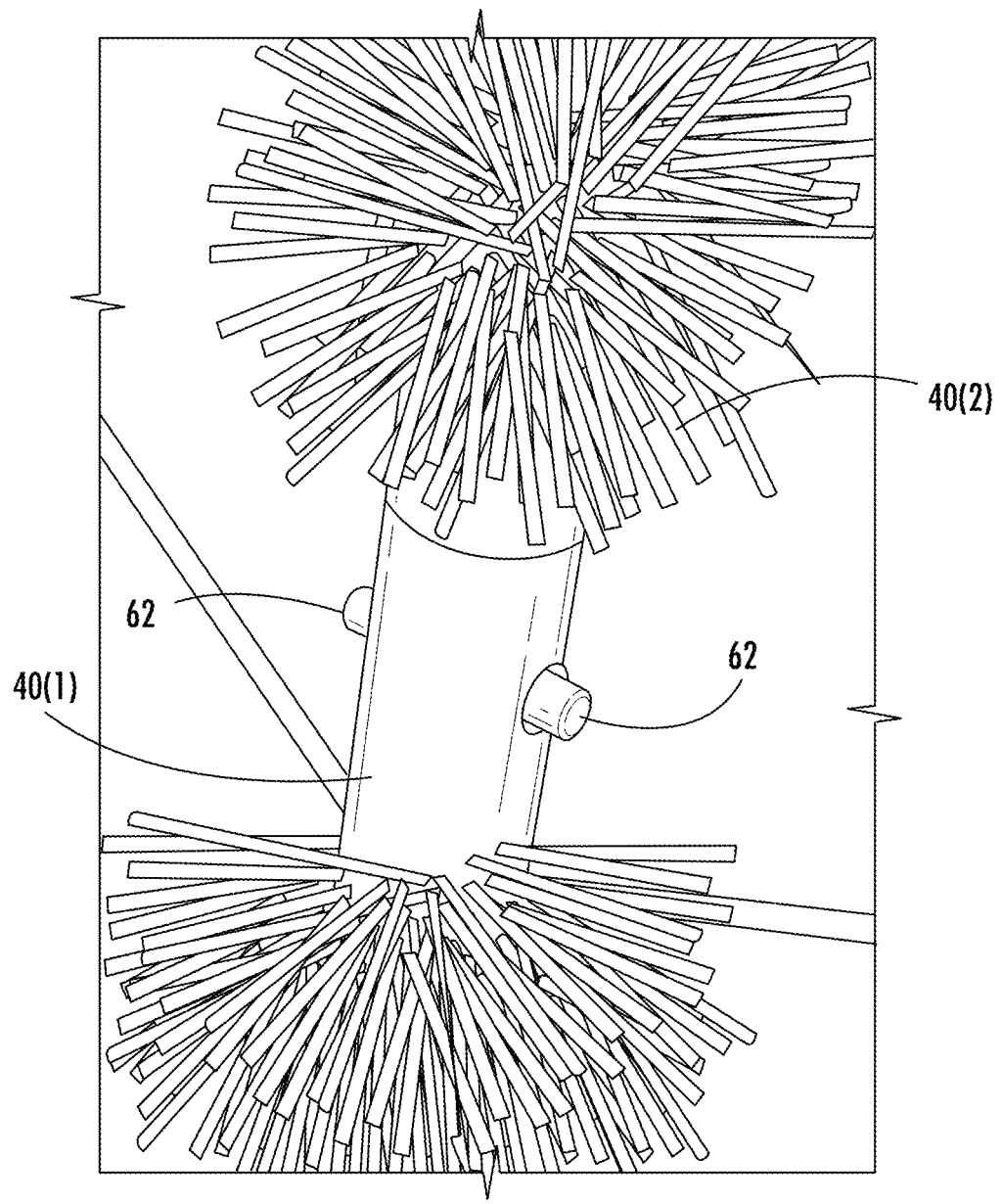
FIG. 9 is a side perspective view of detent pins used to couple together the tree sections of the aquatic habitat structure illustrated in FIG. 1.
Figure 10:
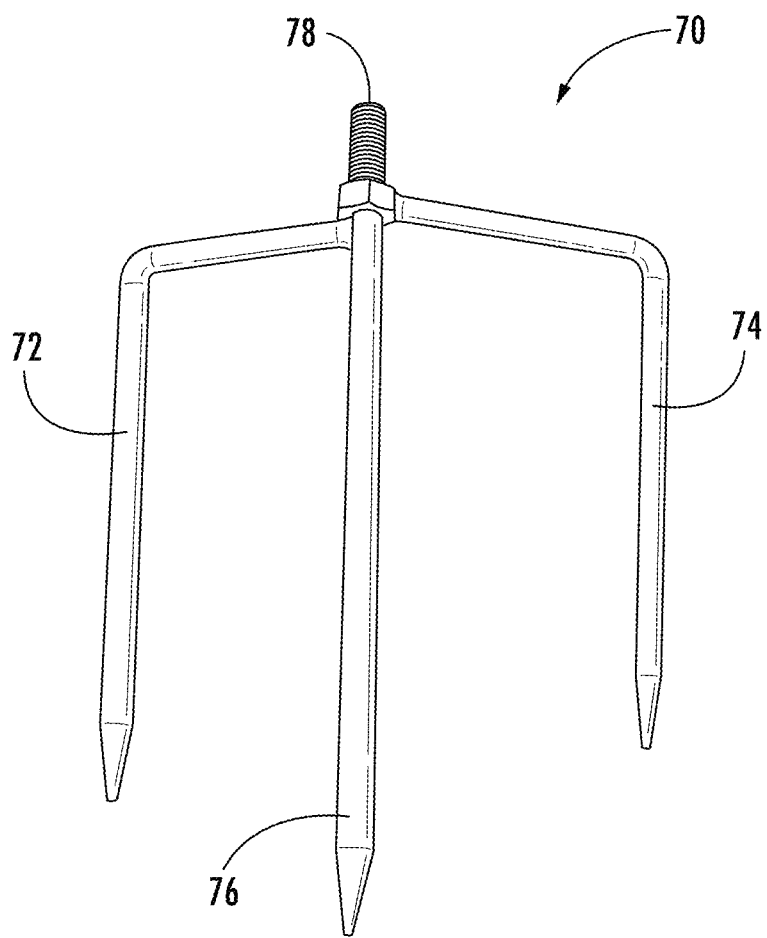
FIG. 10 is a side view of a fork structure to secure the aquatic habitat structure illustrated in FIG. 1 to a bottom of the body of water.
Figure 11:
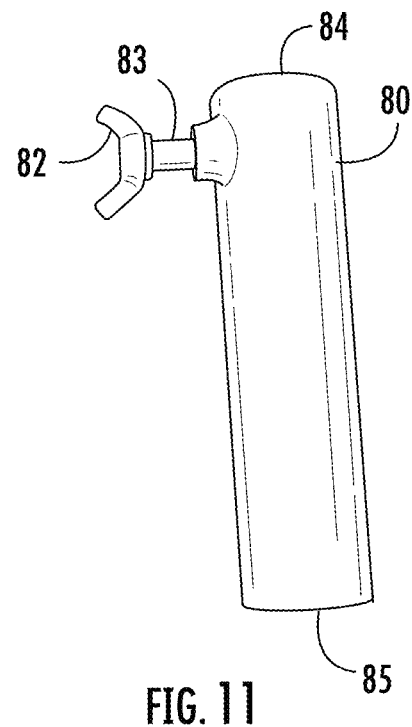
FIG. 11 is a side view of an adapter to be used with the fork structure illustrated in FIG. 10.
Figure 12:
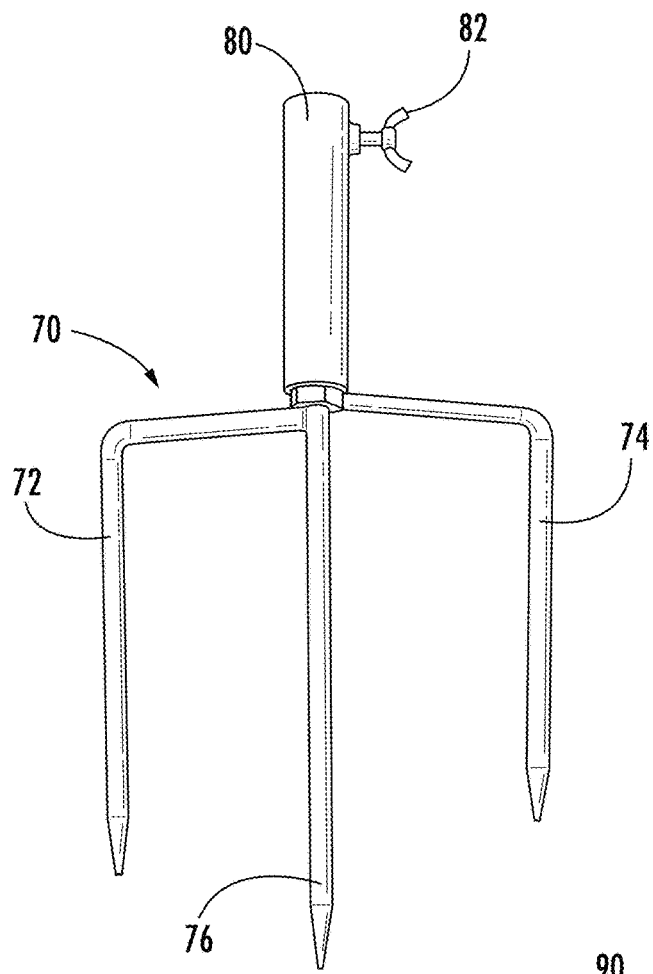
FIG. 12 is a side view of the adapter and the fork structure illustrated in FIGS. 10-11 coupled together.
Figure 13:
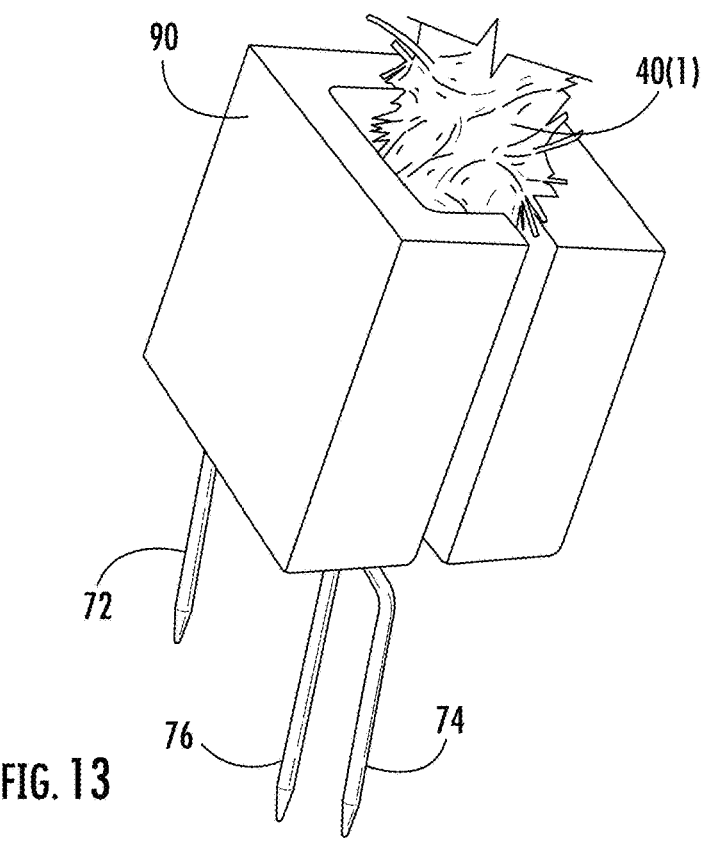
FIG. 13 is a side perspective view of a weighted block carried by the adapter and fork structure illustrated in FIG. 12.

The tree sections 40 may be coupled together using detent pins 62, as illustrated in FIG. 9. Detent pins 62 are designed to quickly and easily connect components with a self-locking mechanism. Detent pins 62 are particularly useful in applications that require frequent manual assembly and disassembly. Ends of the detent pins 62 feature ball bearings and springs that enable the pins to lock in place when the ball bearings are depressed and release when enough force is applied.

In other embodiments, the tree sections 40 may be coupled together using snaps, clips, clasps, clamps or screws, for example. In yet another embodiment, the tree sections 40 may be wedged together by inserting a male end of one of the tree sections 40(1) into a female end of another one of the tree sections 40(2).

Referring now to FIGS. 10-13, a fork structure 70 and an adapter 80 used to secure the aquatic habitat structure 20 to the bottom 32 of the body of water 30 will be discussed. The fork structure 70 includes tines 72, 74 and 76 with slots or opening spaced therebetween. Tines 72 and 76 are coupled together and are formed as one piece. A threaded tip 78 extends from tine 76. Tine 74 is separately formed and is coupled to the other two tines 72, 76 via the threaded tip 78. Tine 74 has a threaded opening that is rotated on the threaded tip 78 until it is snug with tines 72, 76, This advantageously allows the fork structure 70 to be easily packaged for shipping, as well as allowing tine 74 to be positioned in a desired spot with respect to tines 72, 76.

The adapter 80 has a first end 84 configured to receive a bottom end of a lowermost tree section 40(1) of the artificial tree, and a second end 85. After insertion of the bottom end of the lowermost tree section 40(1) into the first end 84, a wing nut 82 secured to a threaded bolt 83 is turned to tighten the threaded bolt 83 against the trunk 42 of the lowermost tree section 40(1).

Next, tips of the tines 72, 74, 76 are inserted into the bottom surface 32 of the body of water 30 to hold the artificial tree in an upright position. Optionally, a weighted block 90 may be placed over the adapter 80 and the fork structure 70 to firmly secure the artificial tree to the bottom surface 32 of the body of water 30.

Figure 14:
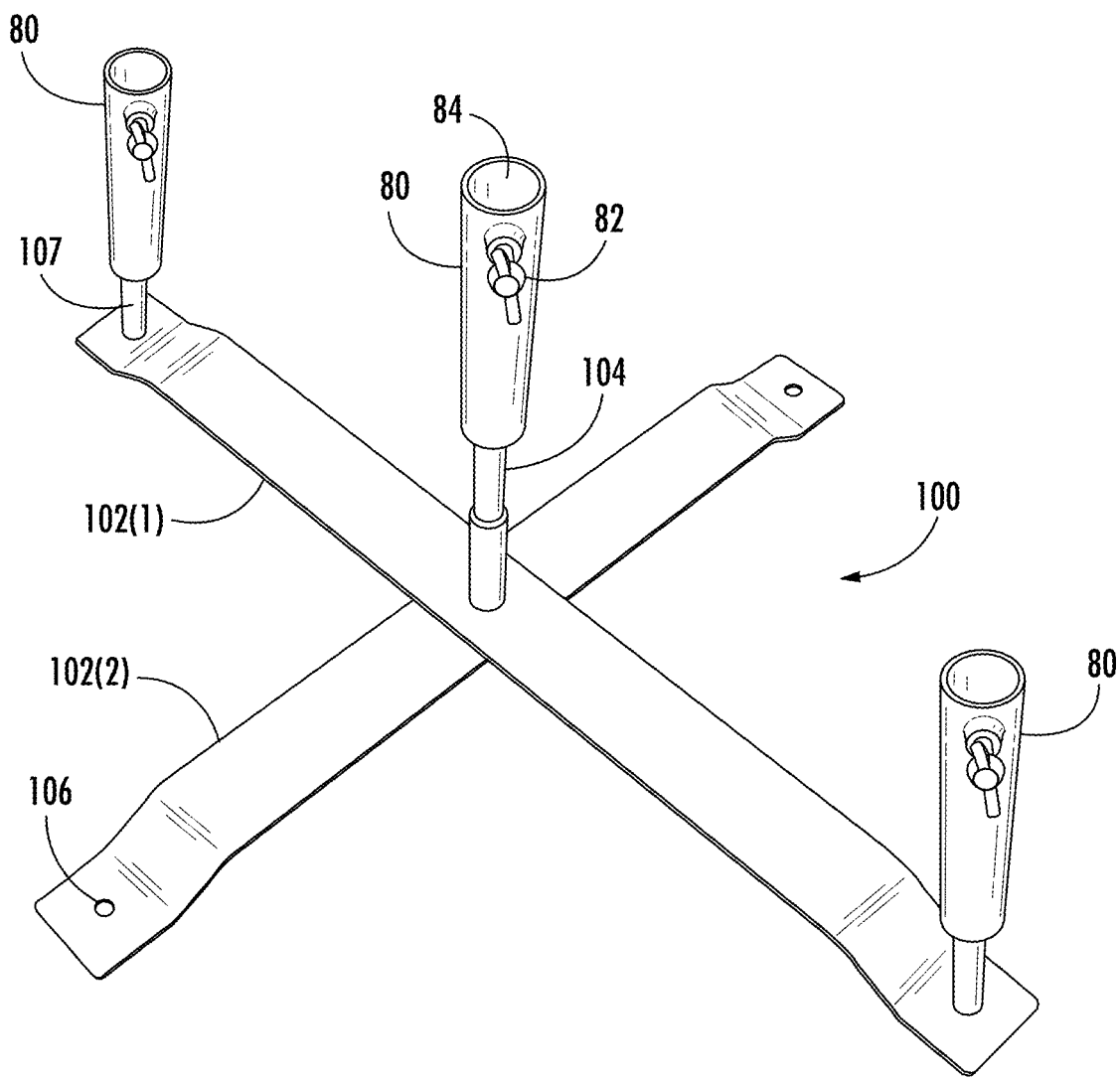
FIG. 14 is a side perspective view of a weighted base to hold the aquatic habitat structure illustrated in FIG. 1 on the bottom of the body of water.
Figure 15:
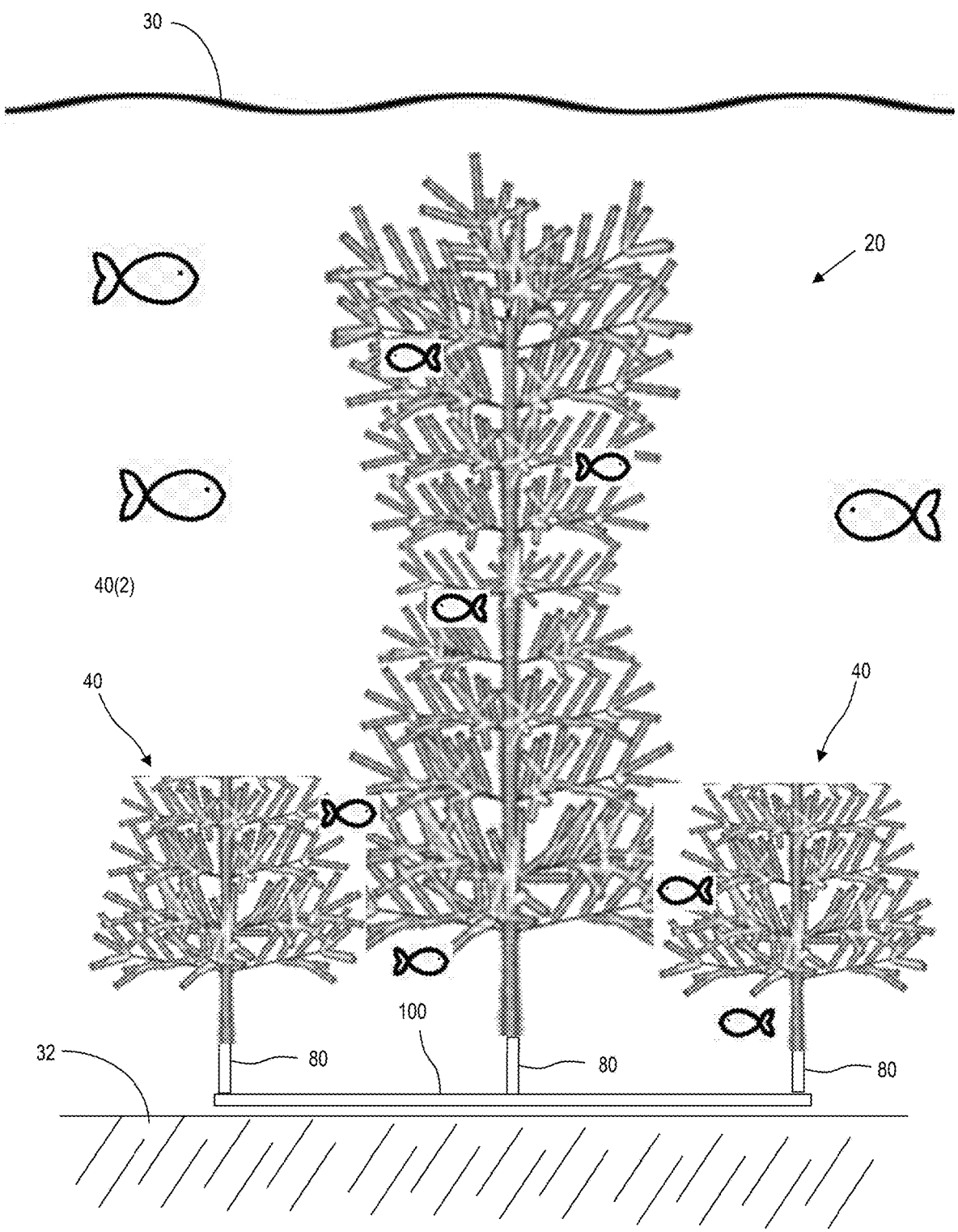
FIG. 15 is a side perspective view of the weighted base illustrated in FIG. 14 holding the aquatic habitat structure and a pair of tree sections.

Referring now to FIGS. 14-15, a weighted base 100 and the adapter 80 used to secure the aquatic habitat structure 20 to the bottom 32 of the body of water 30 will be discussed. The adapter 80 is the same as the above-described adapter 80. The weighted base 100 is formed with a pair of intersecting arms 102(1) and 102(2). At an intersection of the intersecting arms 102(1), 102(2) is a threaded bolt 104 that extends upwards. The second end 85 of the adapter 80 is secured to the threaded bolt 104 by rotating the adapter 80. The first end 84 of the adapter 80 is configured to receive a bottom end of a lowermost tree section 40(1) of the artificial tree. Once the adapter 80 receives the lowermost tree section 40(1) of the artificial tree, the wing nut 82 secured to the threaded bolt 83 is turned to tighten the threaded bolt 83 against the trunk 42 of the lowermost tree section 40(1).

The aquatic habitat structure 20 secured to the weighted base 100 via the adapter 80 may then be placed on the bottom 32 of the body of water 30, as illustrated in FIG. 15. The weighted base 100 is also configured to allow for a cluster of aquatic habitat structures 20 and/or tree sections as illustrated in FIG. 15.

At the ends of the intersecting arms 102(1) and 102(2) are respective openings 106 that may receive a threaded bolt 107. The second end 85 of the adapter 80 is secured to the threaded bolt 107 by rotating the adapter 80. The first end 84 of the adapter 80 is configured to receive a bottom end of a tree section 40. Since the tree sections 40 are interchangeable, anyone of the tree sections 40(1)-40(3) may be used. The tree sections 40 secured to the weighted base 100 may be a single tree section 40, as illustrated, or may be multiple tree sections coupled together.

Many modifications and other embodiments will come to the mind of one skilled in the art having the benefit of the teachings presented in the foregoing descriptions and the associated drawings. Therefore, it is understood that the foregoing is not to be limited to the example embodiments, and that modifications and other embodiments are intended to be included within the scope of the appended claims.

The invention claimed is:

1. An aquatic habitat structure for a body of water comprising:
    a plurality of tree sections coupled together to form an artificial tree, each tree section comprising:
        a trunk having a cylindrical shape with opposing ends and a curved surface extending therebetween, a first plurality of leaflets covering the curved surface of the trunk, and a plurality of spaced-apart layers of limbs extending outwards from the curved surface of the trunk, each layer of limbs comprising a plurality of limbs, each limb comprising a plurality of branches, and each branch covered by a second plurality of leaflets, with each leaflet in the first and second plurality of leaflets providing a biologic surface area for adherence of periphytons to enhance water quality in the body of water, and with the biologic surface area comprising textured regions to provide additional biologic surface areas for the adherence of the periphytons to further enhance the water quality in the body of water;

a weighted base coupled to the artificial tree and configured to rest on a bottom surface of the body of water; and a buoyancy float coupled to the artificial tree to keep the artificial tree in an upright position.

2. The aquatic habitat structure according to claim 1 wherein each leaflet has a rectangular shape, and wherein the textured regions are imprinted on the biologic surface area.

3. The aquatic habitat structure according to claim 2 wherein the textured regions are configured as a uniform pattern of contouring comprising bumps, grooves and ridges.

4. The aquatic habitat structure according to claim 1 wherein each branch is covered with the second plurality of leaflets at a density of 90-100 leaflets per centimeter in length.

5. The aquatic habitat structure according to claim 1 wherein the layer of limbs for each tree section is spaced apart from an adjacent layer of limbs within a range of 7 to 9 inches on the trunk to create communal areas for the congregation of juvenile fish in the body of water, with the communal areas providing protection from larger predator fish.

6. The aquatic habitat structure according to claim 5 wherein each limb is flexible for bending and shaping, and is movable between a stored position and a deployed position, with a free end of each limb in the deployed position being bent and shaped to vary a distance between the limbs in the adjacent layer of limbs.

7. The aquatic habitat structure according to claim 1 wherein the plurality of tree sections comprise a lower tree section, a middle tree section coupled to the lower tree section, and an upper tree section coupled to the middle tree section.

8. The aquatic habitat structure according to claim 7 wherein a width of the lower tree section is equal to a width of the upper tree section, and a width of the middle tree section is less than the width of the lower and upper tree sections to define an hourglass shape of the artificial tree.

9. The aquatic habitat structure according to claim 1 wherein the tree sections are interchangeable with one another.

10. The aquatic habitat structure according to claim 1 wherein the tree sections are coupled together using detent pins.

11. The aquatic habitat structure according to claim 1 comprising:

an adapter having a first end configured to receive a bottom end of a lowermost tree section of the artificial tree, and a second end; and a fork structure coupled to the second end of the adapter and configured to be inserted into a bottom surface of the body of water to hold the artificial tree in an upright position.

12. The aquatic habitat structure according to claim 11 wherein the weighted base is configured as a weighted block carried by the adapter and the fork structure.

13. The aquatic habitat structure according to claim 1 comprising:

an adapter having a first end configured to receive a bottom end of a lowermost tree section of the artificial tree, and a second end coupled to the weighted base.

14. The aquatic habitat structure according to claim 13 comprising:

at least one additional tree section not coupled to the plurality of tree sections;

at least one additional adapter having a first end configured to receive a bottom end of the at least one additional tree section, and a second end; and wherein the weighted base comprises a plurality of intersecting arms, with an end of at least one of the arms configured to be coupled to the second end of the at least one additional adapter so that the at least one additional tree section is resting on the bottom surface of the body of water adjacent the artificial tree.

15. The aquatic habitat structure according to claim 1 wherein the buoyancy float is coupled to an uppermost tree section.

16. An aquatic habitat structure for a body of water comprising:

a plurality of tree sections coupled together to form an artificial tree, each tree section comprising:

a trunk, a first plurality of leaflets on the trunk, and a plurality of spaced-apart layers of limbs extending outwards from the trunk, each layer of limbs comprising a plurality of limbs, each limb comprising a plurality of branches, and each branch covered by a second plurality of leaflets, with each leaflet in the first and second plurality of leaflets having a rectangular shape and providing a biologic surface area for adherence of periphytons to enhance water quality in the body of water, with the biologic surface area comprising textured regions to provide additional biologic surface areas for the adherence of the periphytons to further enhance the water quality in the body of water, and with the textured regions being configured as a uniform pattern of contouring comprising bumps, grooves and ridges;

a weighted base coupled to the artificial tree and configured to rest on a bottom surface of the body of water; and a buoyancy float coupled to the artificial tree and configured to keep the artificial tree in an upright position.

17. The aquatic habitat structure according to claim 16 wherein the plurality of tree sections comprise a lower tree section, a middle tree section coupled to the lower tree section, and an upper tree section coupled to the middle tree section.

18. The aquatic habitat structure according to claim 17 wherein a width of the lower tree section is equal to a width of the upper tree section, and a width of the middle tree section is less than the width of the lower and upper tree sections to define an hourglass shape of the artificial tree.

19. The aquatic habitat structure according to claim 18 wherein the buoyancy float is coupled to the uppermost tree section.

20. A method for improving water quality in a body of water, comprising:
- coupling a plurality of tree sections together to form an artificial tree, each tree section comprising:
  - a trunk having a cylindrical shape with opposing ends and a curved surface extending therebetween,
  - a first plurality of leaflets covering the curved surface of the trunk, and
  - a plurality of spaced-apart layers of limbs extending outwards from the curved surface of the trunk, each layer of limbs comprising a plurality of limbs, each limb comprising a plurality of branches, and each branch covered by a second plurality of leaflets, and
  - with each leaflet in the first and second plurality of leaflets providing a biologic surface area for adherence of periphytons to enhance water quality in the body of water, and with the biologic surface area comprising textured regions to provide additional biologic surface areas for the adherence of the periphytons to further enhance the water quality in the body of water;
- coupling a weighted base to the artificial tree;
- coupling a buoyancy float to the artificial tree; and
- placing the artificial tree in the body of water, with the weighted base configured to rest on a bottom surface of the body of water and with the buoyancy float configured to keep the artificial tree in an upright position.

* * * * *